United States Patent [19]
Betts et al.

[11] Patent Number: 5,206,854
[45] Date of Patent: Apr. 27, 1993

[54] DETECTING LOSS OF ECHO CANCELLATION

[75] Inventors: William L. Betts, St. Petersburg, Fla.; Robert A. Day, II, Manalapan, N.J.

[73] Assignee: AT&T Bell Laboratories, Murray Hill, N.J.

[21] Appl. No.: 766,234

[22] Filed: Sep. 24, 1991

[51] Int. Cl.[5] .............................................. H04B 3/23
[52] U.S. Cl. .................................... 372/32.1; 379/410
[58] Field of Search ........................ 370/32.1, 14, 27; 379/406, 410, 411, 3; 371/57.1

[56] References Cited

U.S. PATENT DOCUMENTS 4,707,824 11/1987 Kanemasa .......................... 370/32.1
4,769,808 9/1988 Kanemasa .......................... 370/32.1

Primary Examiner—Douglas W. Olms
Assistant Examiner—H. Kizou
Attorney, Agent, or Firm—Henry-T. Brendzel

[57] ABSTRACT

In a full-duplex modem, correlation of an echo estimate signal with an echo-canceled signal is used to determine the presence or absence of a remote signal.

5 Claims, 2 Drawing Sheets

5,206,854

DETECTING LOSS OF ECHO CANCELLATION

BACKGROUND OF THE INVENTION

The present invention relates to data communication techniques. In particular it relates to the detection of the presence or absence of a remote signal in a modem that uses echo cancellation.

In the field of data communications, it is often advantageous for data traffic to be carried over a single communications channel, e.g., a "two-wire" circuit, in both directions simultaneously between a near-end and a far-end, or remote, modem. This simultaneous, two-way, transmission is known as 'full-duplex' operation. In order to accommodate full-duplex operation, signal energies from both directions of transmission must be superimposed on this single communications channel simultaneously. As a result, some signal energy from each direction of transmission inevitably leaks through to the opposite direction path. This cross-path leakage allows some of a modem's transmitted signal to appear at the input of tis own receiver. This undesired leaked-through signal is often referred to as "echo." An echo signal can seriously degrade a modem receiver's performance if not mitigated.

Although the echo cannot simply be filtered, it can be reduced to acceptable levels through the use of an adaptive "echo canceler" within the modem. The echo canceler adaptively synthesizes a replica of the echo, which is then subtracted from the received signal, leaving a substantially echo-free signal. This echo-compensated signal is applied to the modem'data receiver. The echo canceler technique has been so successful that it now is a standard component in most full-duplex high-speed modems.

However, modems which employ an echo cancellation technique have a unique difficulty in reliably detecting the presence and absence of the remote signal. Usually, in an echo-canceling modem, an energy detector is placed after the echo canceler in order to measure the combined energy of the remote signal, noise and residual echo. This type of detector provides an estimate of the remote signal plus noise only as long as the residual or uncanceled echo remains relatively small. However, when the connection to the remote modem is abruptly dropped, the resulting change in impedance of the communications channel to the near-end modem causes the residual echo to increase. As a result, the energy detector detects the energy due to the increased signal level of the residual echo and does not detect the disconnect—even through the remote signal has disappeared. When this happens, a user must manually disconnect the modem before attempting to reestablish the connection.

It should also be noted that a modem's receiver can also use its measure of the mean-squared-error (MSE) between the receiver's estimate of the received data and the receiver's equalizer output as an indicator that the connection to a remote modem has been dropped. For example, when the connection to the remote modem is dropped, the MSE increases. However, in echo-canceling modems it has been observed that the receiver, through influence of the equalizer, carrier recovery and timing recovery circuits, may still "lock-on" to the echo signal notwithstanding that during the disconnect of the remote modem the MSE briefly increased.

SUMMARY OF THE INVENTION

The need to reliably detect the presence or absence of a remote signal in an echo-canceled signal is addressed, in accordance with the invention, by detecting a correlation between an echo estimate signal and the echo-canceled signal. Since the echo estimate signal is derived from a transmitted signal, which is the source of the echo signal, this correlation is effectively between the transmitted signal and the echo-canceled signal and is representative of the amount of residual echo, or transmitted signal, present in the echo-canceled signal. As a result, the degree of correlation determines the presence or absence of a remote signal.

In a preferred embodiment of the invention, the echo-canceled signal is separately correlated to a near-end and far-end echo estimate. A detector is placed at the output of each correlator to signal the correlation between the echo-canceled signal and either the near-end or far-end echo estimate signals.

DETAILED DESCRIPTION

Figure 1:
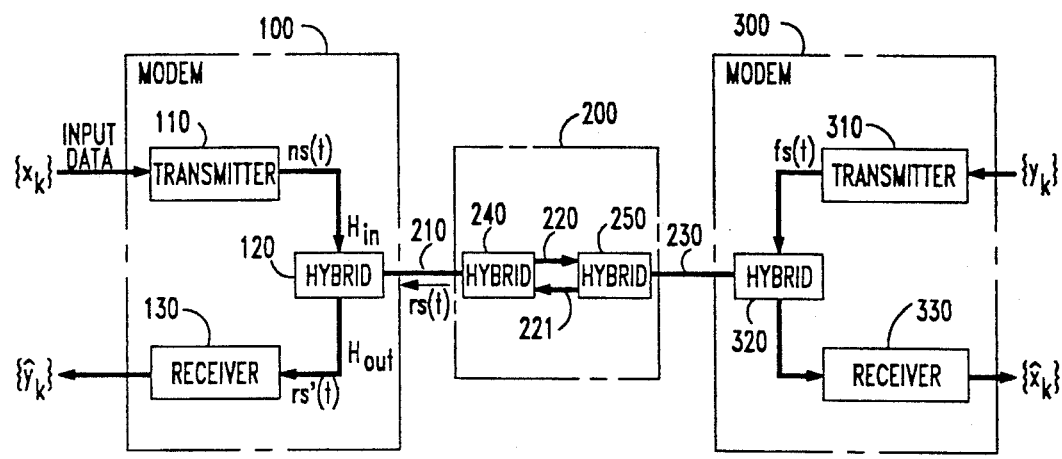
FIG. 1 is a block diagram of a full-duplex communication system.

FIG. 1 shows an illustrative full-duplex communication system employing modems to communicate data over a single communications channel. The operation of the various components is well known. In addition, for simplicity, both modems 100 and 300 are assumed to be identical in structure and operation; therefore, only modem 100 will be described in detail hereinbelow.

Modems 100 and 300 both utilize the same frequency band to simultaneously transmit and receive signals, which are representative of their respective input data sequences $\{X_k\}$, $\{y_k\}$, over channel 200. Illustratively, modems 100 and 300 employ quadrature amplitude modulation (QAM).

Channel 200, which is representative of the Public Switched Telephone Network, consists of bidirectional, "two-wire" customer loops 210 and 230 coupled to unidirectional paths 220 and 221, through hybrids 240 and 250. Two-wire loops 210 and 230 are physical pairs of wire, which carry both directions of transmission simultaneously. Unidirectional paths 220 and 221 may or may not be physical pairs of wires, but in any case comprise what is commonly referred to as a "four-wire" path—in essence, dual two-wire paths, each dedicated to one direction of transmission. Hybrids 240 and 250 perform the "four-wire to two-wire conversion" functions, splitting and combining the signals for each direction of transmission. Similarly, hybrids 120 and 320 perform the directional splitting/combining of the signals within modems 100 and 300, respectively.

The input data sequence $\{x_k\}$ to modem 100 is first processed by transmitter 110 to form near-end transmitted signal ns(t). This signal is representative of the input data sequence to modem 100, and may also include scrambling, redundancy and other forms of encoding. Hybrid 120 couples transmitted signal ns(t) into two-wire loop 210 at input port $H_{IN}$ for transmission to modem 300.

At the same time, far-end modem 300 is similarly transmitting far-end, or remote, signal fs(t). However, the signal received by hybrid 120 is not fs(t) but a version thereof corrupted by (a) various forms of channel-induced distortion including Gaussian noise, intersymbol interference, phase jitter and frequency offset and (b) a so-called far-echo signal $ec_f(t)$ of signal ns(t) caused, for example, by an impedance mismatch at the two-wire loop 230/hybrid 320 interface. The signal received by hybrid 120 is, therefore, signal rs(t), where $$rs(t) = fs(t) + ec_f(t) + \text{distortion}.$$

Hybrid 120 extracts analog received signal rs'(t) from two-wire loop 210, on output port $H_{OUT}$. Ideally, the transfer function u(t) from $H_{IN}$ to $H_{OUT}$ would be zero, so that rs'(t) would consist of solely the received signal, i.e., rs(t), from two-wire loop 210. However, in practice, u(t)≠0, and consequently rs'(t)=rs(t)+$ec_n(t)$. This undesirable signal, $ec_n(t)$, due to the local transmitter, is called 'near-end echo' and represents that portion of the near-end signal energy from ns(t) that leaks through hybrid 120 into receiver 130. Both near-end echo and far-end echo represent sources of interference to a modem receiver and are typically mitigated by corresponding echo cancelers in the receiver.

(Although it will not be discussed in detail in this example, additional echo signals are typically introduced at each four-to-two wire conversion in the system. For example, hybrid 240 may also introduce an echo signal due to an impedance mismatch at the two-wire loop 210/hybrid 240 interface. In what follows, it will be appreciated that the invention applies, with suitable modifications, to any echo signal occurring within the system.)

Figure 2:
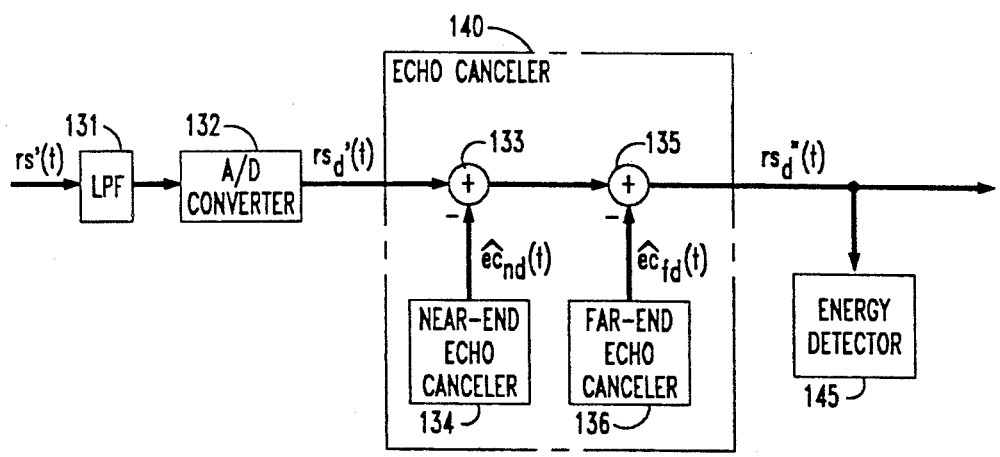
FIG. 2 is a block diagram of a portion of the receiver structure of a prior art modem.

FIG. 2 shows that portion of receiver 130 that mitigates the effects of echo by including echo cancellation, which is typically performed in the digital domain. Analog received signal rs'(t) is processed and converted by low-pass filter (LPF) 131 and analog-to-digital (A/D) converter 132 to form a digital signal rs'$_d$(t), where rs'$_d$(t)=fs$_d$(t)+ec$_{fd}$(t)+distortion$_d$+ec$_{nd}$(t) and the subscript d denotes the digital form of a signal. (As used herein, distortion$_d$ is representative of not only the above mentioned forms of channel induced distortion, but also those forms of distortion introduced at respective points of the receiver. For example, at this point in the receiver, distortion$_d$ also includes quantization error due to A/D converter 132).

Signal rs'$_d$(t) is then applied to echo canceler 140 and combined through adders 133 and 135 with estimates, or approximations, of the near-end and far-end echo, signal $\hat{ec}_{nd}(t)$ and signal $\hat{ec}_{fd}(t)$, respectively. These echo estimates are provided by near-end echo canceler 134 and far-end echo canceler 136. As known in the prior art, an echo canceler is essentially a filter, whose transfer function is adaptively determined so as to emulate, or estimate, the corresponding "echo path." By passing the transmit symbols through this estimated echo path an echo estimate is derived. The resultant output signal from echo canceler 140 is the echo-canceled received signal rs''$_d$(t), where $$rs''_d(t) = fs_d(t) + res\_ec_{nd}(t) + res\_ec_{fd}(t) + \text{distortion}_d.$$

The signals res\_$ec_{nd}$(t) and res\_$ec_{fd}$(t) represent the respective residual echo signal of then ear-end and far-end echo signals, respectively, i.e., res\_$ec_{nd}$(t)=$ec_{nd}$(t)−$\hat{ec}_{nd}$(t) and res\_$ec_{fd}(t)=ec_{fd}$(t)−$\hat{ec}_{fd}$(t). When the respective echo estimates approximate the actual near-end and far-end echo, then, for all practical purposes, the energy of signal res\_$ec_{nd}$(t)≈0 and the energy of signal res\_$ec_{fd}$(t)≈0. As a result, signal rs''$_d$(t) is essentially an echo-free signal, which is then processed by the remainder of receiver 130.

In the prior art, this echo-canceled received signal rs''$_d$(t) is provided to energy detector 145 to determine the presence or absence of the remote signal, i.e., fs(t). However, if there is a disconnect in the near-end echo path, e.g., at the interface between hybrid 120 and two-wire loop 210, of FIG. 1, the resultant impedance change as seen by hybrid 120 causes the near-end echo signal $ec_n$(t) to change, e.g., increase. Typically, echo canceler 134 uses a very small adaptation step size since a larger step size would limit the amount of cancellation that could be achieved in the presence of the received signal. Consequently, any echo estimate will change very slowly. Therefore, for some time, which can typically be several minutes, following the sudden impedance change, echo estimate signal $\hat{ec}_{nd}$(t) will continue to mimic the shape, level, and delay of the echo prior to the change and during this time the energy of signal res\_$ec_{nd}$(t) is much greater that 0 since $\hat{ec}_{nd}$(t) no longer approximates $ec_{nd}$(t). As a result, energy from the near-end residual echo signal is detected by energy detector 145 as representative of the condition that the remote signal is still present-13 when in fact the remote signal has been disconnected. It can typically take a significant amount of time, i.e., on the order of minutes, for near-end echo canceler 134 to eventually approximate the actual near-end echo signal. In the mean time, the modem is left in a state where the modem, and consequently a user, is unaware that the communications connection is lost.

In accordance with this invention, the presence or absence of a remote signal is detected by determining the correlation between the echo estimate and the echo-canceled signal rather than merely measuring the power of the echo-canceled signal. This correlation between the echo estimate signal and the echo-canceled signal is representative of the amount of residual echo present in the echo-canceled signal.

Figure 3:
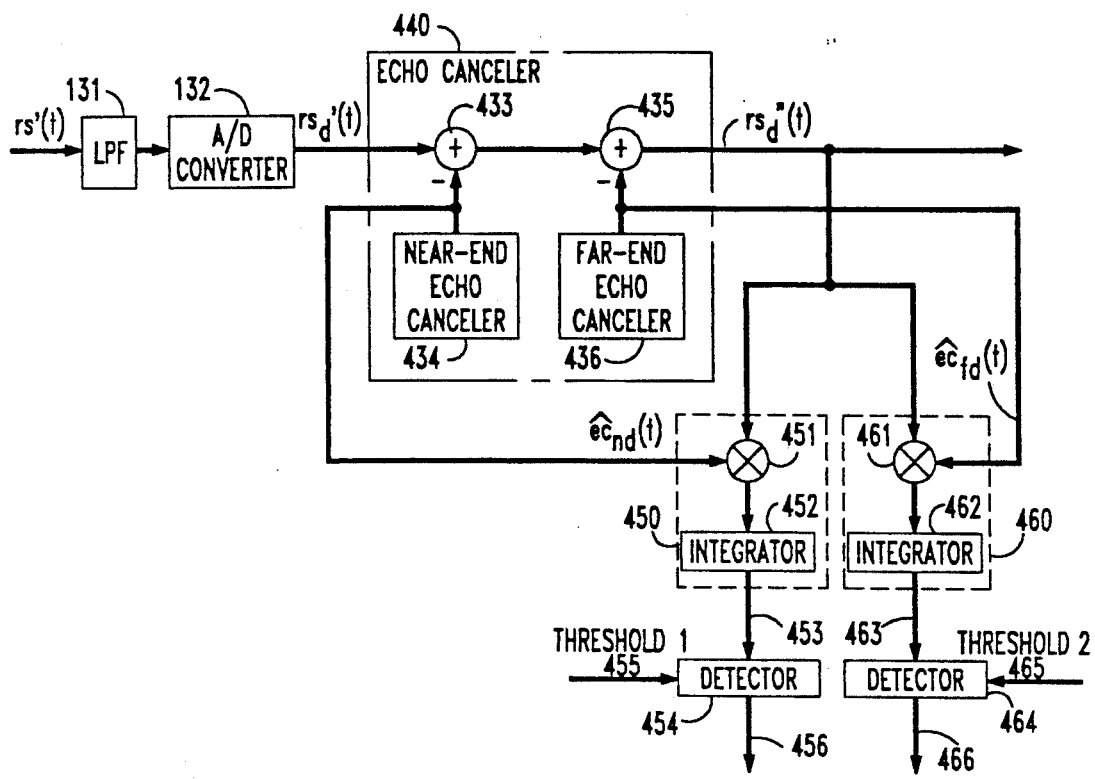
FIG. 3 is a block diagram of a portion of a modem structure embodying the principles of the invention.

An embodiment of the invention is shown in FIG. 3, which is similar to FIG. 2 except that energy detector 145 is augmented by near-end correlator 450, far-end correlator 460, and detectors 454 and 464. (To simplify the description, energy detector 145 is not shown in FIG. 3). The echo-canceled received signal, rs''$_d$(t), and the near-end echo estimate signal, $\hat{ec}_{nd}$(t), are both input to near-end correlator 450. As is known in the art, correlator 450 comprises multiplier 451, which multiplies signals rs''$_d$(t) and $\hat{ec}_{nd}$(t), and integrator 452, which integrates the output of multiplier 451. The output of integrator 452, or alternatively correlator 450, is applied to detector 454. The later signals correlation of the near-end echo estimate with the echo-canceled signal when the degree of correlation exceeds a predetermined value, which is representative of a disconnect. For example, detector 454 simply compares the output of correlator 450 to threshold 1, which is provided to detector 454 on lead 455. This predetermined threshold is empirically determined and depends on the modem design and communications channel characteristics.

Similarly, the echo-canceled received signal, $rs''_d(t)$, and the far-end echo estimate signal, $\hat{ec}_{fd}(t)$ are correlated by far-end correlator 460, which provides an output to detector 464. The later compares the degree of correlation of the far-end echo estimate to threshold 2. As is known in the art, the correlators and detectors can be implemented in any number of ways, e.g., by using a digital signal processor (DSP) integrated circuit.

For example, correlator 450 can be designed to implement the following equation: $C_n = \alpha C_{n-1} + \beta rs''_d(t) \hat{ec}_{nd}(t)$. This equation shows that at a time, t, the current output of correlator 450, $C_n$, is also a function of the previous output of correlator 450, i.e., $C_{n-1}$. As is known in the art, this equation is representative of a digital low pass filter. The factors $\alpha$ and $\beta$ are chosen to control the gain of this filtering operation, e.g., to set a unity gain filter, $\alpha = 0.99$ and $\beta = 0.01$. A similar equation would exist for correlator 460 with substitution of signal $\hat{ec}_{fd}(t)$ for signal $\hat{ec}_{nd}(t)$.

Figure 4:
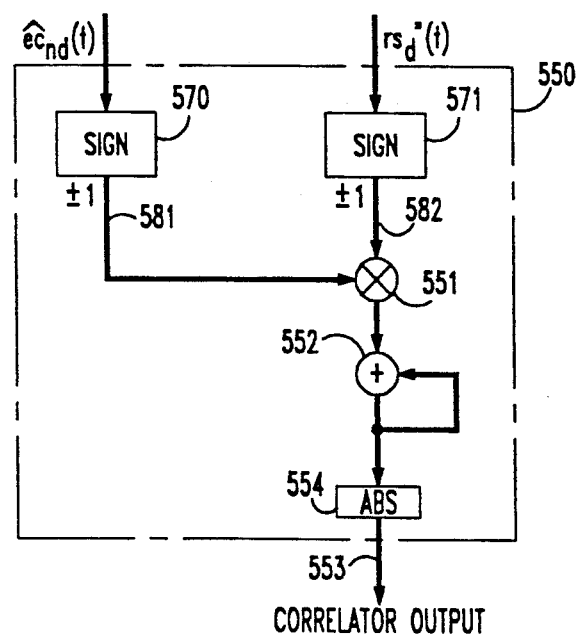
FIG. 4 is an another implementation of the correlator shown in FIG. 3.

It should be noted that the energies of the echo estimate signal and the echo-canceled received signal can vary over a large range. As a result, the multiplication of these signals will result in a product that varies over a large range, which can make selection of an appropriate threshold difficult. One solution is to make the threshold dependent on the product of the energy in signals $rs''_d(t)$ and $\hat{ec}_{nd}(t)$, i.e., to normalize the threshold to the signal energy. Another solution is use of an alternative implementation of a correlator that is independent of the input signal energies. This is shown in FIG. 4. For simplicity, correlator 550 is described in terms of its operation as the near-end correlator, however, a similar description would apply to the use of correlator 550 as the far-end correlator. Both the near-end echo estimate signal, $\hat{ec}_{nd}(t)$, and the echo-canceled received signal, $rs''_d(t)$, are input to respective elements 570 and 571, of correlator 550. Elements 570 and 571 measure the sign of the respective input signal and provide $\pm 1$ on outputs 581 and 582, respectively. As a result, the output of multiplier 551 is limited to $\pm 1$. This output is applied to adder 552, which accumulates the output from multiplier 551. If the two signals $\hat{ec}_{nd}(t)$ and $rs''_d(t)$, are not correlated, the output from accumulator 552 will stay close to, i.e., around, a value of zero. On the other hand, if these signals are correlated, the accumulated sum will increase, or decrease if the correlator inputs are 180 degrees out of phase. It should also be noted that even if the echo estimate signal and the echo-canceled received signal are not correlated, the value of the accumulated sum on lead 553 may, over time, drift from zero. This drift is dependent on the actual statistical properties of the echo estimate signal and echo-canceled received signal. As a result, the accumulated sum of adder 552 may also be periodically reset to zero. This accumulated sum is then applied to element 554, which provides the absolute value (abs) of the accumulated sum on correlator output lead 553. The output of correlator 550 is compared to a threshold, as described hereinabove.

The foregoing merely illustrates the principles of the invention and it will thus be appreciated that hose skilled in the art will be able to devise numerous alternative arrangements which, although not explicitly described herein, embody the principles of the invention and are within its spirit and scope.

For example, although the invention is described in terms of correlating an echo estimate to the echo-canceled received signal, the presence or absence of a remote signal can also be determined by detecting correlation of the transmitted signal with the echo-canceled received signal.

In addition, although the invention is illustrated herein as being implemented with discrete functional building blocks, e.g., echo cancelers, correlators and detectors, etc., the functions of any one or more of those building blocks can be carried out using one or more appropriate programmed processors.

We claim:

1. A method comprising the steps of
   receiving a signal,
   subtracting an echo estimate signal from the received signal to provide an echo-canceled signal,
   correlating the echo estimate signal with the echo-canceled signal to provide a degree of correlation, and
   determining the absence of a remote signal by detecting the degree of correlation of the echo estimate signal with the echo-canceled signal.

2. A method of claim 1 wherein the echo estimate signal further comprises a near-end echo estimate signal and a far-end echo estimate signal.

3. Apparatus comprising
   means for receiving a signal,
   means for subtracting an echo estimate signal from the received signal to provide an echo-canceled signal,
   means for correlating the echo estimate signal with the echo-canceled signal to provide a signal representative of the degree of correlation, and
   means for receiving the signal representative of the degree of correlation to determine the presence or absence of a remote signal.

4. The apparatus of claim 3 wherein the echo estimate signal further comprises a near-end echo estimate signal and a far-end echo estimate signal 5. Modem apparatus comprising
   means for transmitting a first signal,
   means for receiving a second signal,
   echo canceler means to provide an echo estimate signal representative of the first signal,
   means for combining the echo estimate signal and the second signal to provide an echo-canceled signal,
   means for correlating the echo estimate signal with the echo-canceled signal to provide a signal representative of the degree of correlation, and
   means for receiving the signal representative of the degree of correlation to determine the presence or absence of a remote signal.

* * * * *